United States Patent
Pfeffer et al.

(10) Patent No.: US 7,905,433 B2
(45) Date of Patent: Mar. 15, 2011

(54) SYSTEMS AND METHODS FOR REDUCING ELECTROSTATIC CHARGE IN A FLUIDIZED BED

(75) Inventors: Robert Pfeffer, Scottsdale, AZ (US); Jose A. Quevedo, Brick, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 300 days.

(21) Appl. No.: 12/142,883

(22) Filed: Jun. 20, 2008

(65) Prior Publication Data
US 2009/0077826 A1 Mar. 26, 2009

Related U.S. Application Data

(60) Provisional application No. 60/936,407, filed on Jun. 20, 2007.

(51) Int. Cl.
*B02C 19/00* (2006.01)
(52) U.S. Cl. .................. 241/1; 241/5; 241/39; 241/301
(58) Field of Classification Search .................. 241/1, 5, 241/39, 40, 301
See application file for complete search history.

(56) References Cited

U.S. PATENT DOCUMENTS

| | | | | |
|---|---|---|---|---|
| 4,251,360 | A * | 2/1981 | Goldie et al. | 435/7.21 |
| 5,219,543 | A * | 6/1993 | Weisweiler et al. | 423/239.1 |
| 5,354,039 | A * | 10/1994 | Takenoshita et al. | 266/251 |
| 5,620,521 | A * | 4/1997 | Tachikawa et al. | 118/717 |
| 6,946,157 | B2 | 9/2005 | Folestad et al. | |
| 6,960,291 | B2 | 11/2005 | Greaney et al. | |
| 2006/0086834 | A1 * | 4/2006 | Pfeffer et al. | 241/5 |
| 2008/0179433 | A1 | 7/2008 | Pfeffer et al. | |

OTHER PUBLICATIONS

Mehrani et al., Electrostatic Charge Generation in a Gas-Solid Fluidized Beds, Journal of Electrostatics, 63: 165-173, 2005.
Nam et al., "Aerated Vibrofluidization of Silica Nanoparticles," AIChE Journal, vol. 50(8), pp. 1776-1785, 2004.
Yu et al., "Enhanced Fluidization of Nanoparticles in an Oscillating Magnetic Field," AIChE Journal, vol. 51(7), pp. 1971-1979, 2005.
Quevedo et al., "Evaluation of Assisting Methods on Fluidization of Hydrophilic Nanoagglomerates by Monitoring Moisture in the Gas Phase," Chemical Engineering Science, submitted for review, 2006.
Yao, "Characterization of Electrostatic Charges in Freely Bubbling Fluidized Beds With Dielectric Particles," Journal of Electrostatics, vol. 56(183), pp. 191-192, 2002.
U.S. Appl. No. 11/937,787 to Pfeffer, filed Nov. 9, 2007.

* cited by examiner

*Primary Examiner* — Mark Rosenbaum
(74) *Attorney, Agent, or Firm* — McCarter & English, LLP

(57) ABSTRACT

Systems and methods for fluidization of particle and/or powder systems with reduced generation of static electricity are disclosed. The systems/methods are particularly advantageous for fluidization of nanoparticle and/or nanopowder systems, where the generation and/or presence of static electricity is a significant fluidization issue. The systems and methods generally involve the addition of an alcohol or other solvent to a fluidization gas to be introduced to the fluidization chamber, e.g., by bubbling the fluidization gas through a volume of solvent/alcohol, to advantageously reduce the build up of electrostatic charge. Systems and methods for capturing in-situ images within a fluidized bed are also provided that involve reducing the electrostatic charges generated within the fluidized bed and introducing a particle vision and measurement (PVM) probe to the fluidized bed for image capture.

22 Claims, 7 Drawing Sheets

SYSTEMS AND METHODS FOR REDUCING ELECTROSTATIC CHARGE IN A FLUIDIZED BED

CROSS-REFERENCE TO RELATED APPLICATIONS

The present application is related to and claims priority benefit to a commonly assigned provisional patent application entitled "SYSTEMS AND METHODS FOR REDUCING ELECTROSTATIC CHARGE IN A FLUIDIZED BED," which was filed on Jun. 20, 2007 and assigned Ser. No. 60/936,407. The entire contents of the foregoing provisional patent application are incorporated herein by reference.

BACKGROUND

1. Technical Field

The present disclosure is directed to systems and methods for improving fluidization performance. More particularly, the present disclosure is directed to systems and methods for enhancing fluidization of nanoparticles in a fluidized bed, e.g., through reduction in electrostatic charges that would otherwise be present in and negatively impact the performance and/or operation of such a fluidized bed.

2. Background Art

Generation of electrostatic charge is a significant problem when fluidizing dry powders. This problem intensifies if the fluidized powder contains nanoparticles because of the very large specific surface area (surface area per unit mass) in the powder. Indeed, greater levels of electrostatic charge may be generated through triboelectrification, i.e., charge separation associated with the rubbing together of dissimilar (or similar) material surfaces. Such charge separation/electrostatic charge build-up may result from particle-to-particle collisions (similar) and/or collisions between particles and the wall (dissimilar) of the fluidized bed column.

The electrostatic charge generated in a fluidized bed can be particularly problematic with respect to fluidized bed performance for several reasons. First, powder that sticks or adheres to the wall of the fluidized bed can negatively effect fluidized bed performance. FIGS. 1(a), 1(b) and 2 illustrate fluidized bed systems wherein nanopowder has adhered to the wall of the fluidized column due to electrostatic charges. In addition, the formation of clusters of powder that do not fluidize and remain at the bottom of the column, around the distributor and/or around an object placed in the chamber (e.g., a probe) disrupt the flow field in the fluidized bed.

The foregoing phenomena can negatively effect the implementation and performance of a fluidized bed system. For example, if powder sticks/adheres to the wall of the fluidization column or deposits as clusters over the distributor, such powder does not participate in the fluidization process. As a result, transport properties (e.g., heat or mass transfer rates from and to the powder) and reaction rates of a desired chemical reaction (e.g., between the powder and the fluidizing gas), can vary significantly from expected/theoretical levels. These negative effects have been quantified/confirmed by monitoring the moisture adsorbed/desorbed by a fluidized bed of powder. Such testing shows that, when powder sticks to the wall of the column due to electrostatic charge, such powder adsorbs/desorbs less moisture than when the powder is fully fluidized.

Prior efforts have been made to improve the fluidization quality of nanoparticles (in the form of highly porous nanoagglomerates) in a gas fluidized bed. For example, commonly assigned U.S. Patent Publn. No. 2006/0086834 to Pfeffer et al. discloses enhanced fluidization systems that include the introduction of external force and/or pre-treatment to enhance fluidization performance, e.g., sieving, magnetic assistance, vibration, acoustic/sound or rotational/centrifugal forces. Non-provisional patent applications (Ser. Nos. 11/937,736 and 11/937,787; filed Nov. 9, 2007; incorporated herein by reference) to Pfeffer, Quevedo and Flesch disclose the use of microjets to greatly improve the fluidization of so-called ABF type nanoparticles. Further disclosure with respect to external assistance to a fluidization bed is provided by Yu et al., "Enhanced fluidization of nanoparticles in an oscillating magnetic field," *AIChE Journal*, Vol. 51, No. 7, pg. 1971 (2005) and Nam et al., "Aerated vibrofluidization of silica nanoparticles", *AIChE Journal*, Vol. 50 (8), pp. 1776-1785 (2004). Yu et al. disclose the placement of magnetic particles at the bottom of a fluidized bed of nanoparticles and excitation of such magnetic particles with an oscillating magnetic field while Nam et al. disclose placing the bed on a plate which imparts a vertical sinusoidal vibration to the bed (vibro-fluidization). While these methods help to break-down the large clusters of agglomerates at the bottom of the bed, they also promote the generation of electrostatic charge due to an increase in the overall friction between the particles and between the particles and the inside wall of the fluidized bed.

The addition of water vapor to a fluidization chamber to decrease electrostatic charge and enhance fluidization has been disclosed. For example, reference is made to Yao et al., "Characterization of electrostatic charges in freely bubbling fluidized beds with dielectric particles," *Journal of Electrostatics*, Vol. 56, No. 183, pgs. 191-92 (2002). Reference is also made to U.S. Pat. No. 6,946,157 to Folestad et al., entitled "Method and Apparatus for Monitoring the Coating on Particle During Manufacturing of a Pharmaceutical Product," wherein gas is bubbled through a liquid/solvent before introduction to a coating chamber. However, the solvent vapor introduced into the gas by Folestad et al. is used to enhance drying or deposition of the coating layer, and it is not related to decreasing electrostatic charges. Despite efforts to date, a need remains for systems and methods that provide enhanced fluidization, particularly for fluidization systems that include nanoparticles and/or nanopowders. These and other needs are satisfied by the disclosed systems and methods, as will be apparent from the detailed description which follows.

SUMMARY

According to the present disclosure, advantageous systems and methods for fluidization of particle and/or powder systems are provided. The disclosed systems and methods are particularly advantageous for fluidization of nanoparticle and/or nanopowder systems. Exemplary embodiments of the disclosed systems and methods involve and/or facilitate the addition and/or application of an alcohol or other solvent to a fluidization gas to be introduced to the fluidization chamber. Preferred fluidization gas additives for use according to the present disclosure include alcohols, e.g., isopropyl alcohol and ethyl alcohol, mixtures that include alcohols, and other polar molecules and/or mixtures containing such polar molecules. The addition and/or combination of such alcohol/solvent molecules to the fluidization gas have been found to advantageously reduce the build up of electrostatic charge in a fluidized bed, particularly fluidized bed systems that contain nanoparticles and/or nanopowders.

Thus, in an exemplary embodiment of the present disclosure, an alcohol, e.g., isopropyl alcohol, is added to or combined with the fluidizing gas. Combination of the alcohol and the fluidizing gas may be achieved in a variety of ways. In an exemplary implementation, a fluidizing gas, e.g., nitrogen gas, is bubbled through a chamber, e.g., a closed container or vessel, that contains isopropyl alcohol. Through contact with the bubbling gas, the isopropyl alcohol becomes entrained as a vapor in the fluidizing gas and, upon introduction to a fluidizing chamber, comes into contact with the particles/powders to be fluidized therein.

According to systems and methods of the present disclosure, when a fluidizing gas (e.g., nitrogen gas) containing an alcohol vapor (e.g., isopropyl alcohol) is used as the fluidizing gas, advantageous levels of electrostatic charge dissipation are achieved. Indeed, when fluidizing agglomerates of nanoparticles of fumed silica with alcohol-containing nitrogen gas, a higher bed expansion and a higher pressure drop (very close to the weight of the bed per unit area) are achieved, indicating that full fluidization of the nanoparticle system was achieved.

Based on the experimental results set forth herein, it is believed that the use of a fluidizing gas that includes vapor of a polar organic or inorganic solvent, such as an alcohol, organic acid, ammonia and the like, will be effective in dissipating electrostatic charge within a fluidization chamber. The mechanism by which electrostatic charge is reduced is not fully understood. However, such beneficial result may be explained by the fact that these substances exhibit polarity that is effective in reducing inter-molecular friction within the fluidized bed, thereby reducing electrostatic charge. For example, in fluidization of fumed silica, it is believed that the polar section of the solvent molecules bind to the silanol OH groups, leaving the hydrocarbon chain to interact with other non-polar chains. Through this binding action, the generation of electrostatic charge due to friction of polar molecules is reduced. It is noted that in certain powders, it was found that after long periods of time the electrostatic charge builds up even though an alcohol vapor was included in the fluidization gas, but at a level which is lower than when the alcohol vapor is not present.

The concentration of the solvent, e.g., the alcohol, in the fluidizing gas is generally very low and never should reach the saturation point since, at the saturation point, the solvent would condense over the solid particles and generate liquid bridges, hindering fluidization. The concentration of the solvent in the fluidizing gas may be controlled through the conditions used to introduce the solvent to the fluidizing gas, e.g., the fluidizing gas flow rate through the solvent-containing vessel, temperature and pressure conditions within the vessel, solvent level within the container, and the like.

The present disclosure also provides advantageous methods for capturing in-situ images and in-situ measurement of the agglomerate size distribution within a fluidized bed which involve, inter alia, reducing the electrostatic charges generated within the fluidized bed, e.g., through introduction of a polar solvent to the fluidization gas, and introducing a Particle Vision and Measurement (PVM) probe into the fluidized bed for image capture and/or a Focused Beam Reflectance Method (FBRM) probe for measurement of agglomerate size distribution. Exemplary PVM and FBRM probes according to the present disclosure are commercially available from Mettler-Toledo International Inc. (Columbus, Ohio) under the tradename LASENTEC.

Additional features, functions and benefits of the disclosed fluidization systems and methods will be apparent from the detailed description which follows, particularly when read in conjunction with the appended figures.

BRIEF DESCRIPTION OF THE FIGURES

To assist those of ordinary skill in the art in making and using the disclosed systems and methods, reference is made to the accompanying figures, wherein:

In FIG. 1(a), powder blocks the cross sectional area of the column hindering a uniform flow, and in FIG. 1(b), large amounts of powder stick to the wall of the column and do not participate in the fluidization.

FIG. 3(a) shows an entire fluidized bed presenting successful vibro-fluidization of Aerosil® 90 silica (an ABF behavior nanopowder) after being processed with magnetic particles and bubbling the fluidizing gas through isopropyl alcohol (initial bed height was about 26 cm and final bed height was about 99 cm), and FIG. 3(b) is a close-up photograph of the bed surface for successful vibro-fluidization of Aerosil® 90 (an ABF behavior nanopowder) silica, as shown in FIG. 3(a).

FIG. 8(b) is a photograph showing the tip of a PVM probe without nanopowder achieved by removing the electrostatic charge from the bed by using an alcohol vapor according to the present disclosures.

DESCRIPTION OF EXEMPLARY EMBODIMENT(S)

Figure 1:
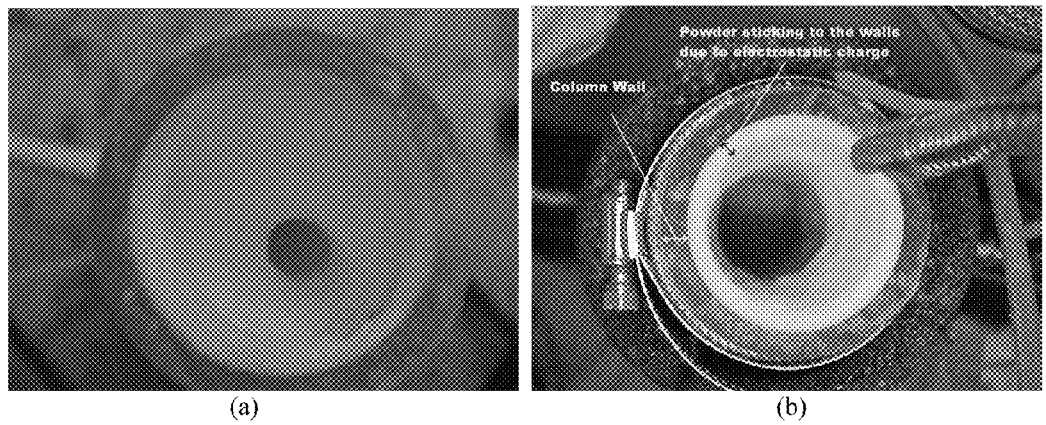
FIGS. 1(a) and 1(b) are photographs of prior art fluidization systems that illustrate nanopowder sticking to the wall of a fluidized column, thereby impeding fluidized bed performance (e.g., nanopowder sticking to the wall of a fluidized column due to electrostatic charge).
Figure 2:
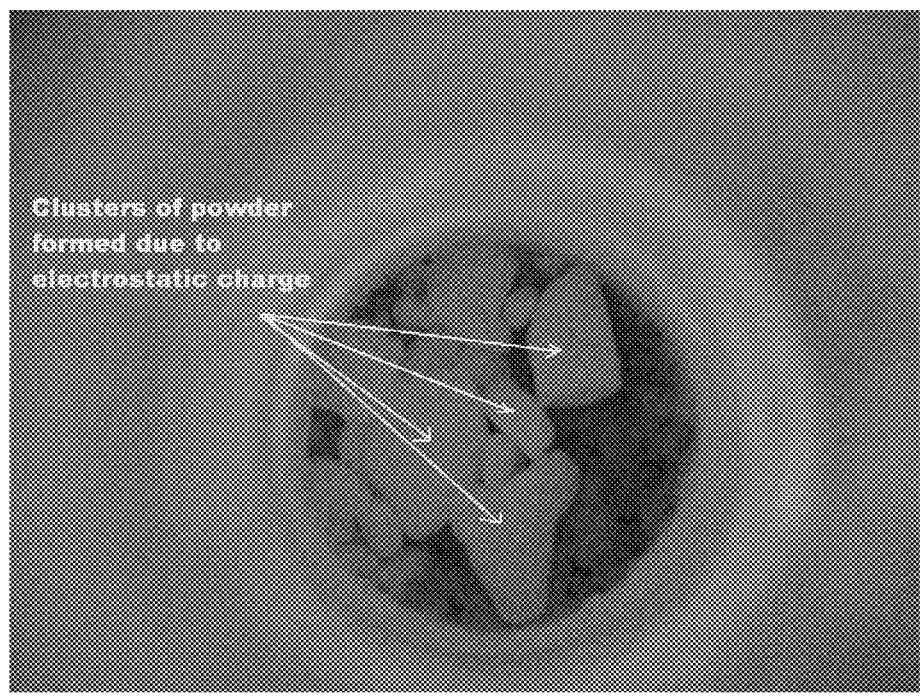
FIG. 2 is a photograph of clusters of powder (agglomerates of nanoparticles) that form over the distributor due to electrostatic charge in a prior art fluidization system.

Systems and methods for fluidization of particle and/or powder systems with reduced generation of static electricity are disclosed herein. The disclosed systems and methods are particularly advantageous for fluidization of nanoparticle and/or nanopowder systems, where the generation and/or presence of static electricity is a significant fluidization issue. The disclosed systems and methods generally involve the addition of an alcohol or other solvent to a fluidization gas to be introduced to the fluidization chamber, e.g., by bubbling the fluidization gas through a volume of solvent/alcohol. Of note, the solvent/alcohol is generally added to the fluidizing gas at a low concentration, and certainly below the saturation point of the solvent/alcohol in the fluidizing gas, so as to avoid the potential for condensation in the fluidization chamber. The use of fluidizing gas streams that contain solvent/alcohol vapor, as disclosed herein, advantageously reduce the build up of electrostatic charge. The present disclosure also provides advantageous methods for capturing in-situ images within a fluidized bed which involve, inter alia, reducing the electrostatic charges generated within the fluidized bed, e.g., through introduction of a polar solvent to the fluidization gas, and introducing a Particle Vision and Measurement (PVM) probe to the fluidized bed for image capture or a Focused Beam Reflectance Method (FBRM) probe for measurement of agglomerate size distribution.

To further illustrate the uses, applications and advantages of the disclosed systems and methods, reference is made to exemplary implementations thereof. These exemplary implementations are merely illustrative of the disclosed systems and methods, and are not limiting thereof. Thus, as will be readily apparent to persons skilled in the art, the systems and methods of the present disclosure are susceptible to many advantageous applications, e.g., all applications involving gas-solid fluidized beds, mixing, coating and granulation applications involving powders (particularly powders of nano and/or micro sizes), processing of powders (particularly powders of nano and micro sizes). Various industries have particular need for the disclosed systems and methods, including specifically the pharmaceutical industry and other industries that handle/process powders in gas-fluidized beds.

With reference to a first exemplary application of the disclosed systems and methods, commercial grade Aerosil® 90 silica is an ABF (agglomerate bubbling fluidization) type nanopowder is very difficult to fluidize, i.e., there is significant bubbling during conventional fluidization causing appreciable gas bypass. If, for example, the gas were used to chemically react with the nanopowder, a significant amount of reactant gas would be lost in the form of gas bubbles. The bed expansion is also very small, e.g., only 1.3 times the initial bed height, indicating a relatively poor quality of fluidization. One reason for the limited bed height expansion and undesirable bubbling phenomena is the presence of large clusters of agglomerates at the bottom of the bed. Magnetic particles moving above the gas distributor have been used to break up the clusters, thereby improving the fluidization somewhat; however, electrostatic charge was generated due to the friction between the magnetic particles and the agglomerates (triboelectrification), diminishing the beneficial effect of the magnet particle-assist methodology.

According to the present disclosure, addition of alcohol vapor to the conventional/dry fluidization gas was effective in enhancing fluidization performance. Thus, in an exemplary implementation of the present disclosure, nitrogen gas was bubbled through a volume of isopropyl alcohol to introduce isopropyl alcohol vapor into the nitrogen fluidization gas stream. Such alcohol-containing fluidization gas was introduced to a fluidization chamber that contained commercial Aerosil® 90 silica and energized magnetic particles (for disrupting silica agglomerates). The net result of the alcohol-containing fluidization gas and the agglomerate-disrupting force was significantly increased bed height and reduced bubbling for an Aerosil® 90 silica powder system.

Figure 3A:
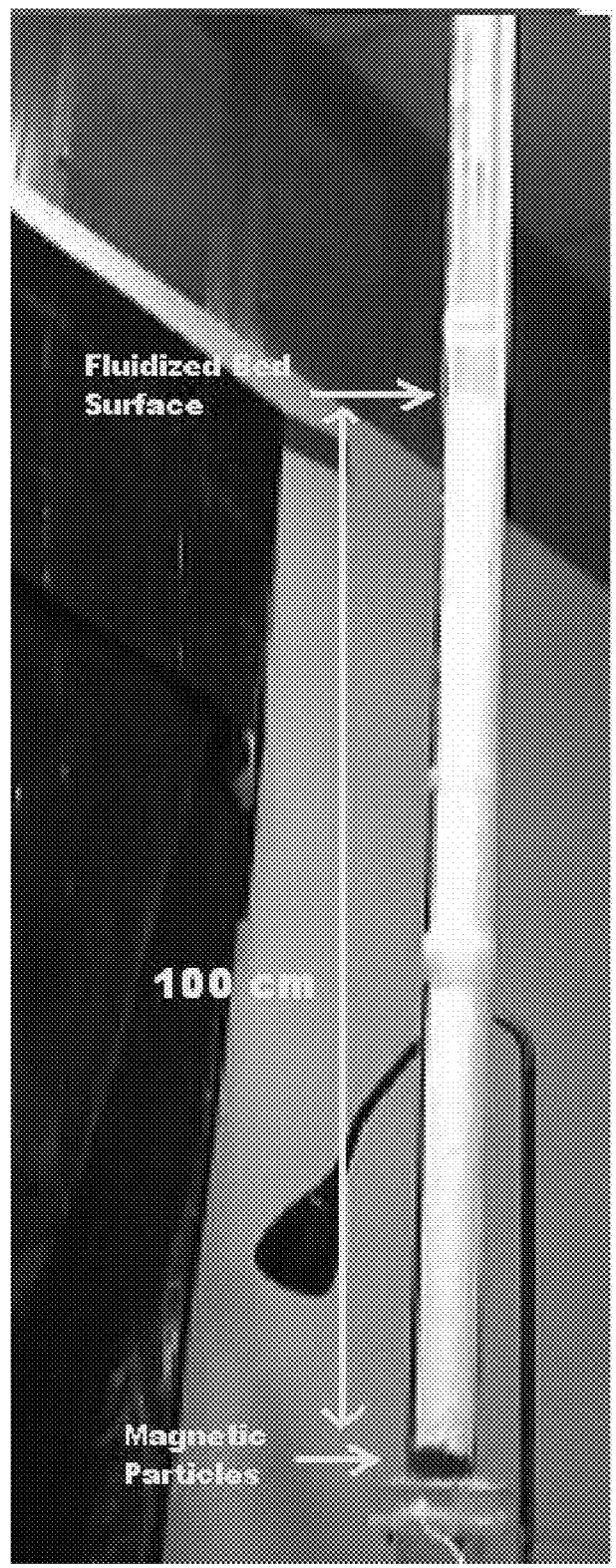
FIGS. 3(a) and 3(b) are photos of a vibro-fluidized bed that reflects effective fluidization of a commercial Aerosil®90 silica powder after having been processed with magnetic particles and fluidizing gas that includes isopropyl alcohol, according to the present disclosure. In particular.
Figure 3B:
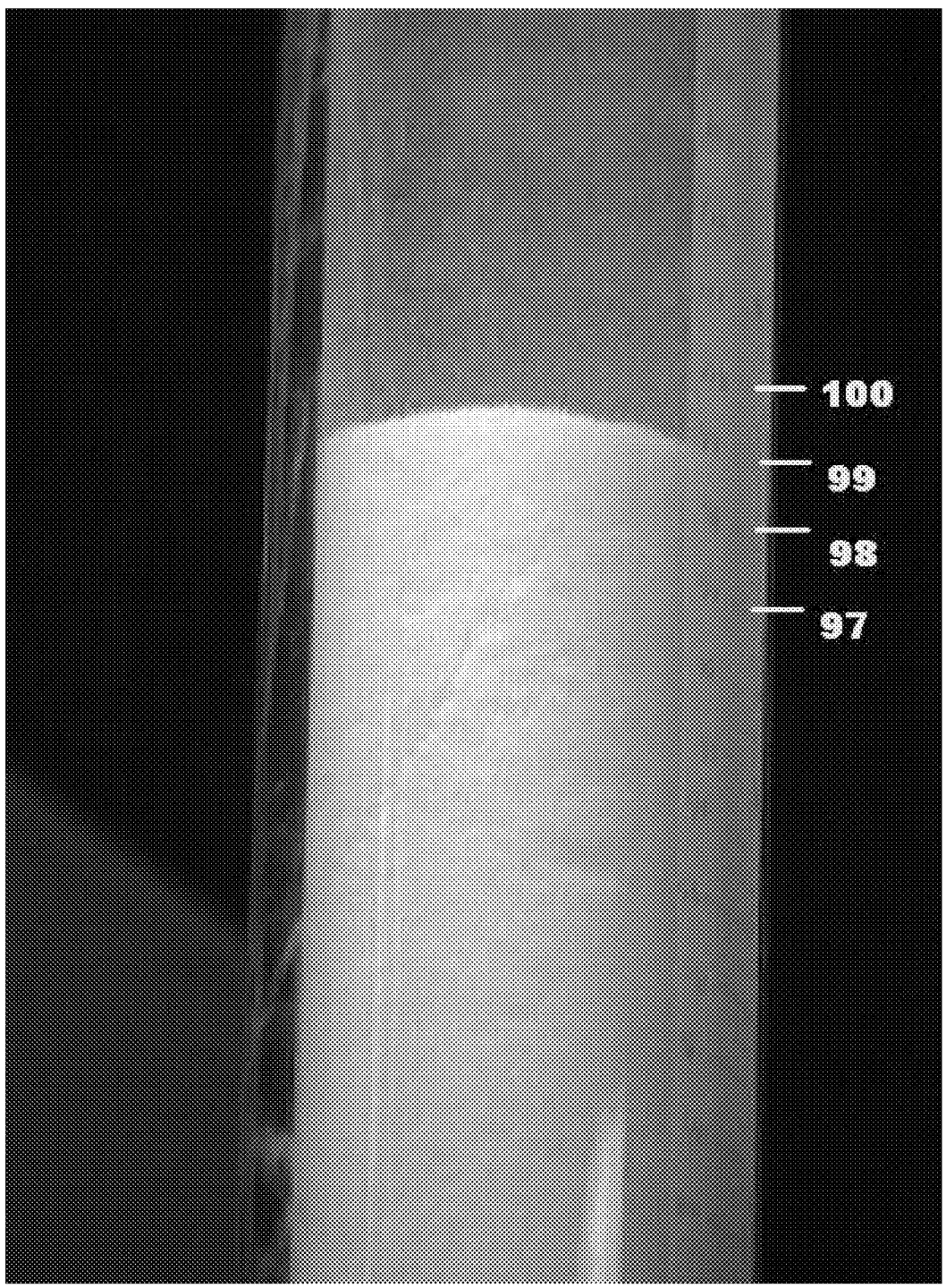

The advantageous results achieved according to the disclosed system/method are shown in FIGS. 3(a) and 3(b). As shown therein, a vibro-fluidized bed of commercial Aerosil® 90 silica (Degussa GmbH, Parsippany, N.J.) expanded to a bed height of about 99 cm from an initial bed height of about 26 cm after being processed by magnetic assistance and the presence of alcohol vapor in the fluidizing gas. The magnetic particles were energized in accordance with the teachings of U.S. Patent Publn. No. 2006/0086834 to Pfeffer et al., the contents of which are hereby incorporated by reference herein. Without the use/presence of the disclosed alcohol in the fluidization gas, the silica powder does not show significant bed expansion due to electrostatic effects which hinder the fluidization. The addition of alcohol vapor is just as effective if micro-jets, as described in a co-pending provisional patent application (Ser. No. 60/858,072; filed Nov. 10, 2006; Pfeffer and Quevedo; previously incorporated herein by reference) are used to process the powder, instead of moving magnetic particles.

The enhancement effects of the alcohol on fluidization is also evidenced in a fluidized bed of APF (agglomerate particulate fluidization) type nanopowder which generally fluidizes easily at low gas velocities without bubbling. An exemplary APF powder is Aerosil® 200 silica (Degussa GmbH, Parsippany, N.J.). During conventional fluidization of Aerosil® 200 silica nanopowder without alcohol, there is a large bed expansion (several times the initial bed height depending on gas velocity) and the fluidization is relatively smooth and homogeneous, without bubbles; however, significant amounts of powder can be seen on the wall of the acrylic plastic column due to electrostatic charge. Adherence of such powder on the chamber wall causes non-uniformity/non-homogeneity within the fluidized bed, which can translate to unacceptable processing results. The disadvantageous segregation of powder on the fluidization chamber wall is overcome and/or substantially eliminated through the addition of alcohol to the fluidizing gas according to the present disclosure. In addition, the fluidized bed height and the pressure drop across the fluidized bed increase further, indicating that the powder that was sticking/adhering to the wall before the alcohol was added to the fluidization gas is now fully participating in the fluidization.

Aerosil® 90 silica extracted from the production process (unlike commercial Aerosil® 90 silica) is an APF type nanopowder that expands several times its initial bed height when conventionally fluidized. As was found for the commercial grade of Aerosil® 200 silica, as described above, the use of alcohol vapor as an additive to the fluidization gas is effective in reducing electrostatic charge and providing significant improvements to the fluidization performance of such Aerosil® 90 silica nanopowder.

Figure 4:
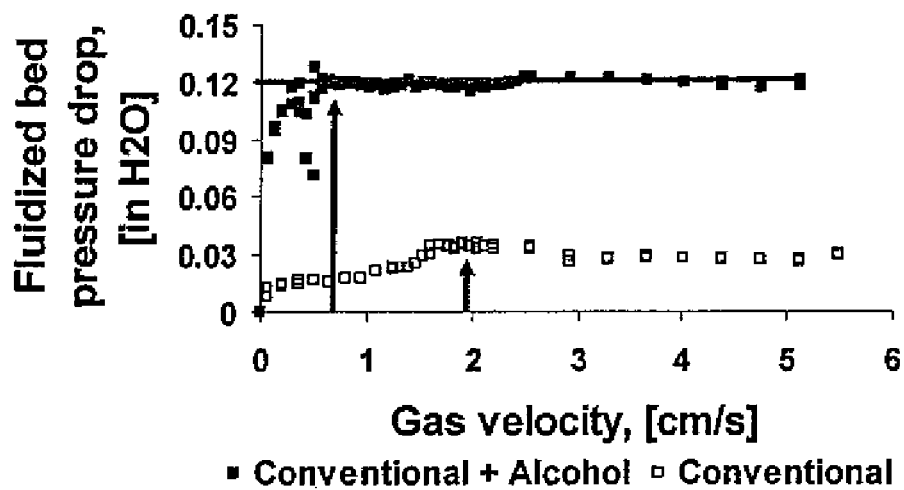
FIG. 4 is a plot of fluidized bed pressure drop as a function of fluidized gas velocity for an alcohol-containing fluidizing gas system according to the present disclosure as compared to a control fluidizing gas system. in particular, the FIG. 4 graph represents a comparison of fluidized bed pressure drop as function of gas velocity of a conventional (dry $N_2$) fluidizing gas relative to a reduced electrostatic charge (by adding alcohol vapor) fluidized bed of Aerosil® 200 silica (amount of powder used was 15.5 g). Minimum fluidization velocity values are given by the vertical arrows and pressure drop corresponding to the weight of the bed per unit area is given by the horizontal line.
Figure 5:
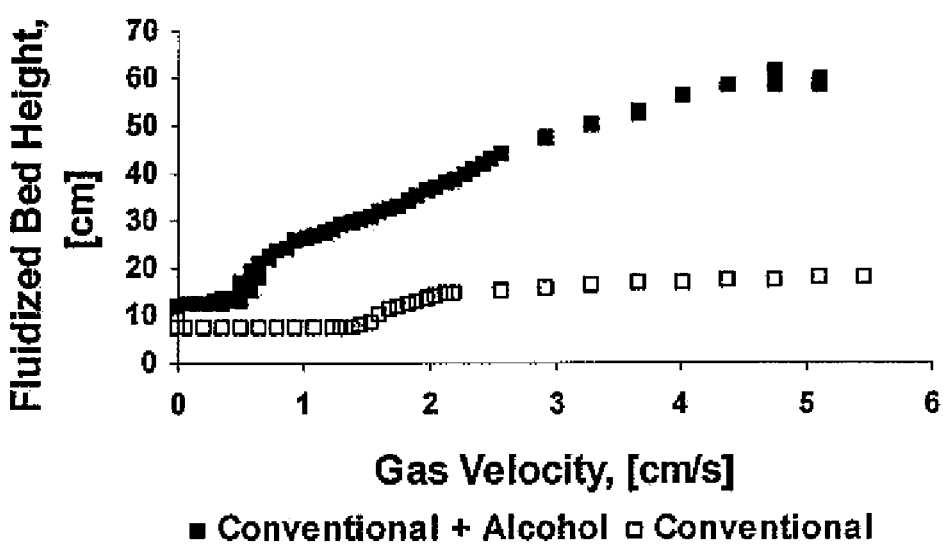
FIG. 5 is a plot of fluidized bed height as a function of fluidized gas velocity for an alcohol-containing fluidizing gas system according to the present disclosure as compared to a control fluidizing gas system. In particular, the graph in FIG. 5 shows a comparison of the fluidized bed height as function of gas velocity of a conventional (dry $N_2$) fluidizing gas relative to a reduced electrostatic charge (by adding alcohol vapor) fluidized bed of Aerosil® 200 silica (amount of powder used was 15.5 g).

FIGS. 4 and 5 show the fluidization characteristics of Aerosil® 200 silica when fluidized with and without alcohol addition to the fluidizing gas. A clear improvement can be seen when the alcohol (isopropyl alcohol) is added to the fluidization gas, as demonstrated by: (i) the larger bed expansion height, (ii) the reduction in the minimum fluidization velocity, and (iii) the increased amount of powder suspended in the gas phase (since the pressure drop approaches the weight of the bed per unit area).

Figure 6:
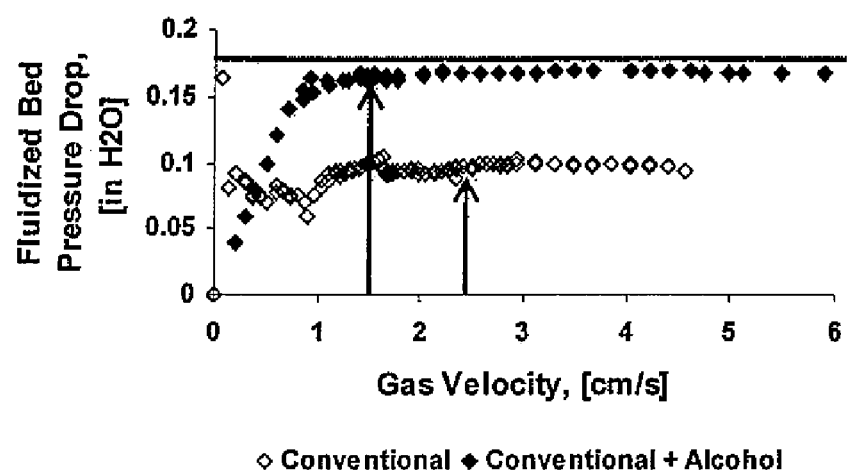
FIG. 6 is a plot of fluidized bed pressure drop as a function of fluidized gas velocity for an alcohol-containing fluidizing gas system according to the present disclosure as compared to a control fluidizing gas system for an alternative powder system. In particular, the chart in FIG. 6 represents a comparison of fluidized bed pressure drop as function of gas velocity of a conventional (dry $N_2$) fluidizing gas relative to a reduced electrostatic charge (by adding alcohol vapor) fluidized bed of Aerosil® 90 (non-commercial grade) silica (amount of powder used was 20.5 g). Minimum fluidization velocity values are given by the vertical arrows and pressure drop corresponding to the weight of the bed per unit area is given by the horizontal line.
Figure 7:
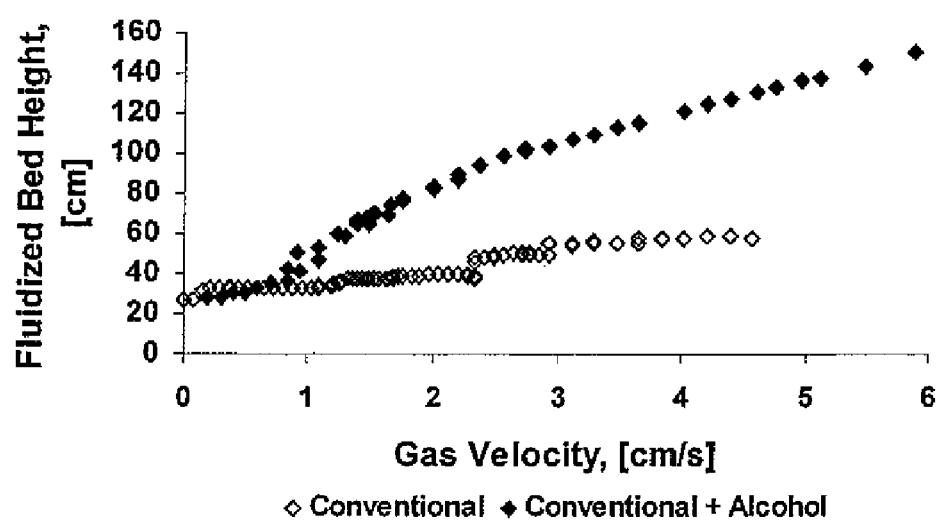
FIG. 7 is a plot of fluidized bed height as a function of fluidized gas velocity for an alcohol-containing fluidizing gas system according to the present disclosure as compared to a control fluidizing gas system for an alternative powder system. In particular, the chart in FIG. 7 represents a comparison of fluidized bed height as function of gas velocity of a conventional (dry $N_2$) fluidizing gas relative to a reduced to a reduced electrostatic charge (by adding alcohol vapor) fluidized bed of Aerosil® 90 (non-commercial grade) silica (amount of powder used was 20.5 g).

Similarly, FIGS. 6 and 7 show the fluidization characteristics of a non-commercial grade of Aerosil® 90 silica which fluidizes like an APF type nanopowder. As with the positive results reflected in FIGS. 4 and 5 for fluidization systems containing Aerosil® 200 silica, the addition of alcohol to the fluidizing gas enhances the fluidization by (i) increasing the bed height (FIG. 6) and (ii) reducing the minimum fluidization velocity (FIG. 7).

Although the foregoing experimental results are based upon systems that include particular nanoparticle/nanopowder systems (silica), a particular fluidizing gas (nitrogen), and a particular solvent addition to the fluidizing gas (isopropyl alcohol vapor), the systems and methods of the present disclosure are not limited to such exemplary embodiments and implementations. Rather, various nanoparticle/nanopowder systems, various fluidizing gas systems, and various solvent additives may be employed without departing from the spirit or scope of the present disclosure. Indeed, vapors of polar organic and/or inorganic solvents, such as an alcohol, organic acid, ammonia and the like, will be effective in dissipating electrostatic charge within a fluidization chamber according to the present disclosure. Thus, for example, fluidization gas additives for use according to the present disclosure may include alcohols, e.g., isopropyl alcohol and ethyl alcohol, mixtures that include alcohols, and other polar molecules and/or mixtures containing such polar molecules.

Introduction of the additive, e.g., an alcohol, to the fluidizing gas may be achieved by bubbling the fluidization gas, e.g., nitrogen, through a chamber that contains the solvent, e.g., isopropyl alcohol. Through contact with the bubbling gas, the isopropyl alcohol becomes entrained as a vapor in the fluidizing gas and, upon introduction to a fluidizing chamber, comes into contact with the particles/powders to be fluidized therein.

In a further advantageous application of the systems and methods of the present disclosure, it has been found that the addition of a solvent, e.g., an alcohol vapor, to a fluidization gas so as to dissipate electrostatic charge facilitates in situ imaging of a fluidized bed system, including particularly the fluidized particles contained therewithin. Thus, in an exemplary embodiment, the disclosed solvent-containing fluidization gas is introduced to a fluidization chamber to facilitate fluidization of a particle/powder system, e.g., a nanoparticle and/or nanopowder system. The disclosed fluidization system may include a disruptive energy source (assisting method), e.g., moving magnetic particles, vibration, sound waves or microjets to disrupt potential large agglomerate cluster formation. Image capture is then effectuated within the fluidized system using a desired capture device, e.g., a (PVM) probe or a FBRM probe to measure agglomerate size distribution.

In a preferred image capture application or agglomerate size distribution analysis, a commercially available PVM probe, e.g., the Lasentec® V700S probe or a commercially available FBRM probe, the Lasentec® D600L (Mettler-Toledo International Inc.; Columbus, Ohio), is introduced into the fluidized bed to study visually, inter alia, the size distribution of the nanoagglomerates in a fluidized bed in situ. The exemplary Lasentec® V700S probe has a diameter of 25 mm and a length of 318 mm. Its magnification can be adjusted from 5× to 10× and its field view is 1.65×1.24 mm.

Figure 8A:
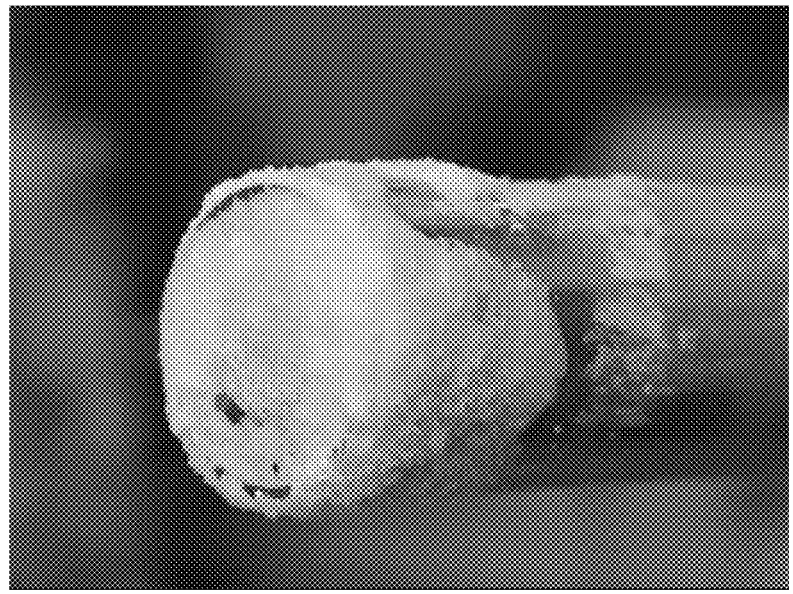
FIG. 8(a) is a photograph of a Particle Vision and Measurement (PVM) probe covered with nanopowder due to electrostatic charge in connection with a prior art fluidization system.

In the absence of the disclosed systems and methods for reducing static electricity within a fluidized bed, introduction of a PVM probe to a fluidized bed of nanoparticles—where fluidization was effected with conventional dry nitrogen as the fluidizing gas—encounters substantial electrostatic effects which cause the nanoagglomerates to completely coat the instrument. The coating effect is shown in the image of FIG. 8a, With nanoparticles adhered to the surface of the probe, no images of the agglomerates within the fluidized bed can be captured or seen.

Figure 8B:
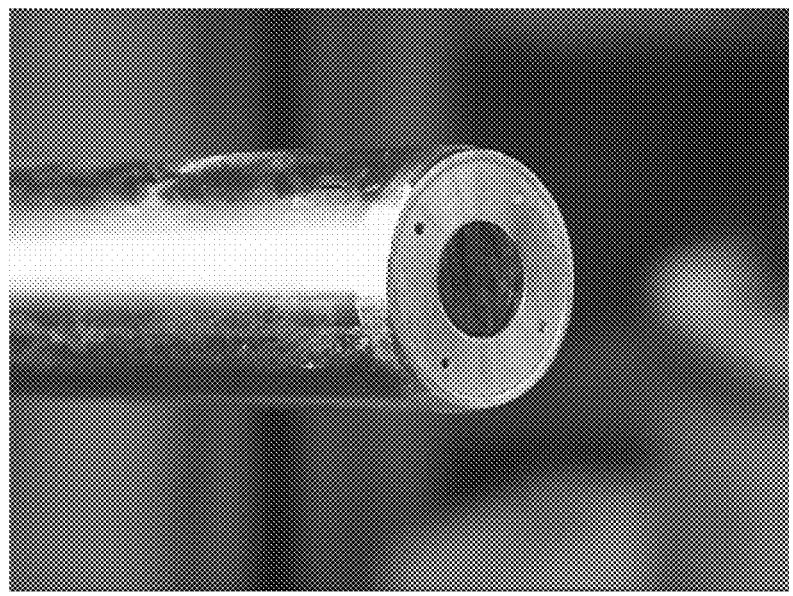
FIG. 8(b) is a photograph of a PVM probe without adhered nanopowder in connection with a nanopowder fluidization system according to the present disclosure. In particular.
Figure 9:
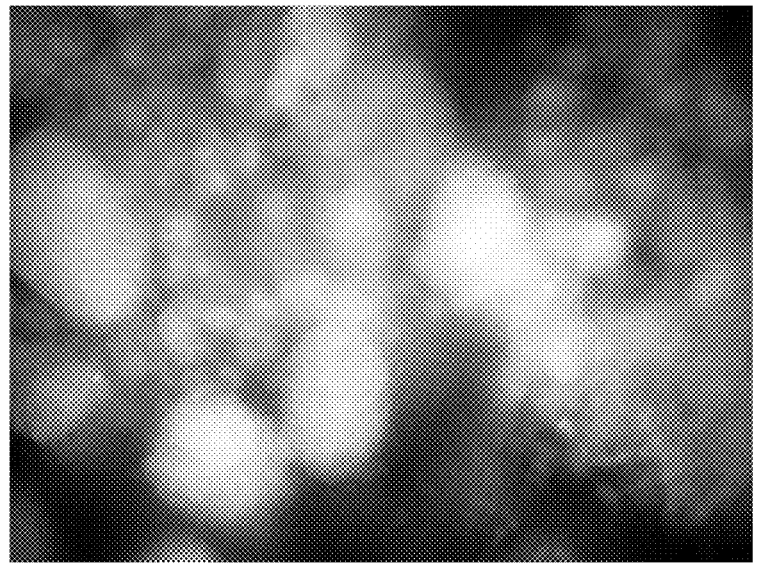
FIG. 9 is an in-situ image of silica agglomerates (APF type) captured by a PVM probe in a conventional fluidized bed.
Figure 10:
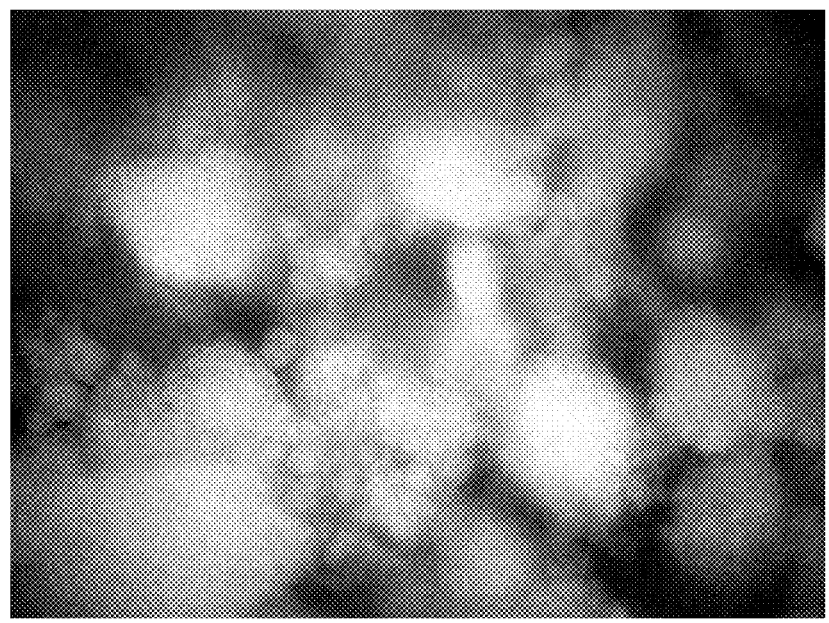
FIG. 10 is a further in-situ image of silica agglomerates (ABF type) captured by a PVM probe in a conventional fluidized bed.

However, when the fluidizing gas (e.g., nitrogen) is first bubbled through an appropriate solvent (e.g., isopropyl alcohol), the electrostatic charges are substantially eliminated/dissipated. Thus, as shown in FIG. 8b, the PVM probe remains free of adhered agglomerates/powder, thereby permitting effective agglomerate images to be captured. Exemplary images are shown in FIG. 9 for Aerosil® 974 silica, an APF type nanopowder, and in FIG. 10 for Aerosil® 90 silica, an ABF type nanopowder. As is readily apparent from the images of FIGS. 8(a), 8(b), 9 and 10, the disclosed systems and methods for reducing/eliminating static electricity in a fluidized bed environment advantageously facilitate in situ imaging of fluidized particles/powders using conventional probes.

In sum, exemplary systems and methods for dissipation of electrostatic charge to provide better fluidization of particles which normally would stick to one another and/or to the wall/distributor of the fluidizing column, e.g., when fluidizing either APF or ABF type agglomerates of nanoparticles, generally entail the following:

The fluidizing gas is bubbled through a liquid/solvent characterized by having molecules with a desired polarity and a significant vapor pressure at the operating temperature of the fluidized bed.

The liquid/solvent is one or a combination of the following substances: an alcohol, an organic acid or a solution containing a polar molecule such as ammonia, and the vapors from the liquid are mixed with the gas used in the fluidization of the powder.

The concentration of the liquid/solvent in the gas phase is generally small and, as an upper boundary, should be less than the concentration required to promote condensation in the fluidization environment. To the extent the concentration were to exceed such upper boundary level, adverse effects are likely to be encountered in fluidization performance based on the formation of agglomerate clusters due to liquid bridges. The concentration of the alcohol in the fluidizing gas was generally less than 5% per volume in the experimental runs described herein.

Although the systems and methods of the present disclosure have been described with reference to exemplary embodiments and implementations, the present disclosure is not limited to or by such exemplary embodiments and/or implementations. Rather, the disclosed systems and methods are susceptible to various changes, modifications and/or enhancements without departing from the spirit or scope hereof. Accordingly, the present disclosure expressly encompasses all such changes, modifications and/or enhancements within its scope.

What is claimed is:

1. A system for fluidizing particles, comprising:
   a. a fluidizing chamber for receipt of particles for fluidization;
   b. a fluidizing gas for introduction to the fluidizing chamber, the fluidizing gas including entrained vapor from at least one liquid solvent that is effective to reduce electrostatic charge in the fluidizing chamber;
   c. a vessel containing the at least one liquid solvent to be introduced to the fluidizing chamber;
   wherein the fluidizing gas is bubbled through the at least one liquid solvent in the vessel to entrain vapor of the at least one liquid solvent in the fluidizing gas prior to introducing the fluidizing gas to the fluidizing chamber; and
   wherein the vapor from the at least one liquid solvent is entrained in the fluidizing gas at a concentration below a boundary level that would effect substantial condensation within the fluidizing chamber.

2. The system of claim 1, wherein the concentration of the entrained vapor from the at least one liquid solvent in the fluidizing gas introduced to the fluidizing chamber is less than about 5% per volume.

3. The system of claim 1, wherein the particles are selected from nanoparticles, microparticles and combinations thereof.

4. The system of claim 1, wherein the fluidizing gas is inert or reactive.

5. The system of claim 4, wherein the fluidizing gas is an inert gas and said inert gas is nitrogen.

6. The system of claim 1, wherein the at least one solvent is a polar organic solvent, a polar inorganic solvent, or a combination thereof.

7. The system of claim 1, wherein the at least one solvent is selected from the group consisting of an alcohol, an organic acid, ammonia and combinations thereof.

8. The system of claim 1, further comprising a source of energy that is effective to break up large agglomerates or clusters of particles within the fluidizing chamber.

9. The system of claim 8, wherein the source of energy includes moving magnetic particles, vertical vibration, sound waves, micro-jets or combinations thereof, positioned in the fluidizing chamber.

10. The system of claim 1, further comprising an image capture device introduced into the fluidizing chamber to capture one or more images of the particles in situ in a fluidized state.

11. The system of claim 10, wherein the image capture device is a PVM probe.

12. The system of claim 1, further comprising an agglomerate size distribution measurement device introduced into the fluidizing chamber to measure the agglomerate distribution in situ in a fluidized state.

13. The system of claim 12, wherein the agglomerate size distribution measurement device is a FBRM probe.

14. The system of claim 1, further comprising a device or probe that emits light introduced into the fluidizing chamber for in situ measurement purposes.

15. A method for fluidizing particles, comprising:
   a. introducing particles into a fluidization chamber;
   b. bubbling a fluidizing gas through a vessel containing at least one liquid solvent to entrain vapor of the at least one liquid solvent in the fluidizing gas;
   c. introducing the fluidizing gas to the fluidization chamber, the fluidizing gas including the entrained vapor from the at least one liquid solvent;
   wherein the vapor from the at least one liquid solvent is entrained in the fluidizing gas at a concentration below a boundary level that would effect substantial condensation within the fluidizing chamber; and
   wherein the entrained vapor from the at least one liquid solvent is effective to reduce electrostatic charge within the fluidizing chamber.

16. The method of claim 15, wherein the particles are selected from nanoparticles, microparticles and combinations thereof.

17. The method of claim 15, wherein the concentration of the entrained vapor from the at least one liquid solvent in the fluidizing gas introduced to the fluidizing chamber is less than about 5% per volume.

18. The method of claim 15, further comprising energizing a source of energy that is effective to break up large agglomerates or clusters of the particles within the fluidizing chamber.

19. The method of claim 18, wherein the source of energy includes magnetic particles, vertical vibration, sound waves, microjets or combinations thereof positioned in the fluidizing chamber.

20. The method of claim 15, further comprising introducing an image capture device into the fluidizing chamber to capture one or more images of the particles in a fluidized state.

21. The method of claim 15, further comprising introducing an agglomerate size distribution measurement device into the fluidizing chamber to measure the agglomerate distribution in a fluidized state.

22. The method of claim 15, further comprising introducing a device or probe that emits light into the fluidizing chamber.

* * * * *